(12) United States Patent
Tokuhashi et al.

(10) Patent No.: US 11,068,288 B2
(45) Date of Patent: Jul. 20, 2021

(54) METHOD OF CONTROLLING COMMUNICATION SYSTEM INCLUDING MODE SWITCHING BETWEEN MODES FOR RECEIVING A TOUCH INPUT OR AN AUDIO INPUT, COMMUNICATION SYSTEM, AND STORAGE MEDIUM

(71) Applicant: Hitachi, Ltd., Tokyo (JP)

(72) Inventors: Kazumasa Tokuhashi, Tokyo (JP); Yoshitaka Hiramatsu, Tokyo (JP); Toshimitsu Takahashi, Tokyo (JP); Tasuku Soga, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 16/360,048

(22) Filed: Mar. 21, 2019

(65) Prior Publication Data

US 2019/0391828 A1 Dec. 26, 2019

(30) Foreign Application Priority Data

Jun. 26, 2018 (JP) .............................. JP2018-120888

(51) Int. Cl.
*G06F 3/14* (2006.01)
*G06F 9/451* (2018.01)
*G06F 3/0482* (2013.01)
*G06F 3/0488* (2013.01)
*G06F 3/16* (2006.01)

(52) U.S. Cl.
CPC ............ *G06F 9/453* (2018.02); *G06F 3/0482* (2013.01); *G06F 3/04886* (2013.01); *G06F 3/167* (2013.01)

(58) Field of Classification Search
CPC ........... G06F 3/14; G06F 3/0482; G06F 9/453
USPC .......... 715/709; 381/107; 455/466; 700/259; 345/156, 173
See application file for complete search history.

(56) References Cited

U.S. PATENT DOCUMENTS

| | | |
|---|---|---|
| 5,878,274 A | 3/1999 | Kono et al. |
| 7,406,420 B2 | 7/2008 | Daimoto et al. |
| | (Continued) | |

FOREIGN PATENT DOCUMENTS

| | | |
|---|---|---|
| EP | 0 680 035 A1 | 11/1995 |
| EP | 2 017 828 A1 | 1/2009 |
| | (Continued) | |

OTHER PUBLICATIONS

Extended European Search Report received in corresponding European Application No. 19163997.0 dated Oct. 23, 2019.
(Continued)

*Primary Examiner* — Ruay Ho
(74) *Attorney, Agent, or Firm* — Mattingly & Malur, PC

(57) ABSTRACT

A dialogue system includes an inquiry step of generating and outputting inquiry information, an input step of accepting a reply, and a guidance step of generating and outputting candidates of guidance information corresponding to the answer. The dialogue system includes a mode for outputting options based on the inquiry information to the touch panel and a dialogue mode for outputting comments based on the inquiry information by the touch panel or the sound output device and selects them according to the operation situation of the dialog system A mode switching step, and the inquiring step and the guiding step use the selected mode.

7 Claims, 11 Drawing Sheets

(56) References Cited

U.S. PATENT DOCUMENTS

| | | | | |
|---|---|---|---|---|
| 8,896,561 | B1* | 11/2014 | Engel | G06F 3/0488 |
| | | | | 345/173 |
| 10,199,051 | B2* | 2/2019 | Binder | G10L 15/22 |
| 2004/0236574 | A1 | 11/2004 | Ativanichayaphong et al. | |
| 2013/0316746 | A1* | 11/2013 | Miller | H04L 51/30 |
| | | | | 455/466 |
| 2014/0369527 | A1* | 12/2014 | Baldwin | H03G 7/002 |
| | | | | 381/107 |
| 2015/0314454 | A1* | 11/2015 | Breazeal | B25J 9/0003 |
| | | | | 700/259 |
| 2016/0110158 | A1 | 4/2016 | Park | |
| 2016/0188291 | A1* | 6/2016 | Vilermo | G06F 3/162 |
| | | | | 345/156 |
| 2017/0206064 | A1* | 7/2017 | Breazeal | H04N 13/239 |
| 2019/0179608 | A1* | 6/2019 | Kothari | G06F 9/451 |

FOREIGN PATENT DOCUMENTS

| | | |
|---|---|---|
| JP | 9-91112 A | 4/1997 |
| JP | 2004-54080 A | 2/2004 |
| JP | 2010-026686 A | 2/2010 |
| JP | 2011-2534 A | 1/2011 |

OTHER PUBLICATIONS

Japanese Office Action received in corresponding Japanese Application No. 2018-120888 dated Jun. 1, 2021.

* cited by examiner

33 ENVIRONMENT AND USER UTILIZATION SITUATION TABLE

| | USER 1 | USER 2 | ... | |
|---|---|---|---|---|
| CURRENTLY PARTICIPATING USER COUNT (E.G., HOW MANY USERS ARE IN FRONT OF TERMINAL) | 1 | | | 331 |
| NOISE | LOW | LOW | | 332 |
| LAST DIALOGUE MODE | MODE 2 | | | 333 |
| DIALOGUE COUNT | 4 | | | 334 |
| SPEECH RECOGNITION PRECISION (SUCCESS COUNT) | 50% | | | 335 |
| INTERVAL TIME TO INPUT | 2 SECONDS | | | 336 |
| USER SITUATION | TOUCH: NOT POSSIBLE (HANDS ARE FULL) | | | 337 |
| USER POSITION | TO THE LEFT | | | 338 |
| ... | | | | |

*Fig. 5*

| 400 SHOP TABLE | | |
|---|---|---|
| 401 | 402 | 403 |
| RESTAURANTS | JAPANESE FOODS | xxxxxxxxxxxxxxxxxxxxx xxxxxxxxxxxxxxxxxxxxx xxxxxxxxxxxxxxxxxxxxx xxxxxxxxxxxxx |
| | WESTERN-STYLE FOODS | xxxxxxxxxxxxxxxxxxxxx xxxxxxxxxxxxxxxxxxxxx xxxxxxxxxxxxxxxxxxxxx xxxxxxxxxxxxx |
| | CHINESE FOODS | xxxxxxxxxxxxxxxxxxxxx xxxxxxxxxxxxxxxxxxxxx xxxxxxxxxxxx |
| SHOPS | CLOTHES | xxxxxxxxxxxxxxxxxxxxx xxxxxxxx |
| | SHOES | xxxxxxxxxxxxxxxxxxxxx xxxxxxxxxxxxxxxxxxxxx xxxxx |
| | MISCELLANEOUS GOODS | xxxxxxxxxxxxxxxxxxxxx xxxxxxxxxxxxxxxxxxxxx xxxxxxxx |
| SERVICE FACILITIES | MOVIE THEATERS | xxxxxxxxxxxxxxxxxxxxx xxxxxxxxxxxxxxxxxxxxx xxxxxxxxxxxxxxxxxxxxx x |
| | HAIRCUT SALONS | xxxxxxxxxxxxxxxxxxxxx xxxxxxxxx |

*Fig. 9*

METHOD OF CONTROLLING COMMUNICATION SYSTEM INCLUDING MODE SWITCHING BETWEEN MODES FOR RECEIVING A TOUCH INPUT OR AN AUDIO INPUT, COMMUNICATION SYSTEM, AND STORAGE MEDIUM

CLAIM OF PRIORITY

The present application claims priority from Japanese patent application JP 2018-120888 filed on Jun. 26, 2018, the content of which is hereby incorporated by reference into this application.

BACKGROUND

This invention relates to a dialogue system using audio and a touch panel.

In recent years, speech recognition technology has come into wide use with the advance of machine learning. It is becoming more difficult to provide, by existing staff alone, a diversity of interpersonal services including facility information guidance at airports and stations, which requires services to be provided in various languages, and over-the-counter services at financial institutions, local governments, and the like, which handle a plurality of complicate services. In order to assist with such service operations ever increasing in sophistication, practical application of a dialogue system in the form of a robot, an audio assistant, and other forms, is being advanced.

A system of JP 2010-26686 A, for example, is known as a dialogue system. In JP 2010-26686 A, there is disclosed a communication terminal using a navigator character for interactive communication and using input on a touch panel in combination to complement interactive communication through speech recognition.

SUMMARY

When a user of a dialogue system operates a control apparatus including a touch panel to receive a service, the precision of speech recognition may be low depending on the user's utterance and background noise. In the case of a dialogue system using touch input alone, when touch operation is required to be performed many times to reach a desired option among numerous options, it may take long to perform touch operation, or a user may feel inconvenience in touch operation.

This invention has been made in view of the problems described above, and an object of this invention is to provide a user-friendly dialogue system complementing audio input and touch input with each other.

An aspect of this disclosure is a method of controlling a dialogue system including a processor, a memory, an audio input apparatus, an audio output apparatus, and a touch panel including a display unit configured to process touch input. The method includes an inquiry step of generating, by the processor, inquiry information including at least one option, and outputting the inquiry information from one of the audio output apparatus and the touch panel, an input step of receiving, by the processor, an answer to the inquiry information through one of the audio input apparatus and the touch panel, a guidance step of generating, by the processor, candidates for guidance information that correspond to the answer, and outputting the candidates for the guidance information from one of the audio output apparatus and the touch panel and a mode switching step of choosing, by the processor, a mode suitable for a running status of the dialogue system from a first dialogue mode, in which options being areas for receiving the touch input based on the inquiry information are output to the touch panel, and a second dialogue mode, in which a comment based on the inquiry information is output from one of the touch panel and the audio output apparatus, each of the inquiry step and the guidance step comprising using one of the first dialogue mode and the second dialogue mode that is chosen in the mode switching step.

Thus, according to one embodiment of this invention, a user-friendly dialogue system complementing audio input and touch input with each other can be provided by a switch that is made between a first dialogue mode, in which options are displayed, and a second dialogue mode, in which a comment to be presented to a user is displayed or spoken without newly displaying options, depending on the running status of the dialogue system.

BRIEF DESCRIPTION OF THE DRAWINGS

FIG. 5 is a table for showing an example of the environment and user utilization situation table to be used by the control module according to the embodiment of this invention.

FIG. 9 is a table for showing an example of the shop table to be used by the control module according to the embodiment of this invention.

DETAILED DESCRIPTION OF THE PREFERRED EMBODIMENTS

Figure 1:
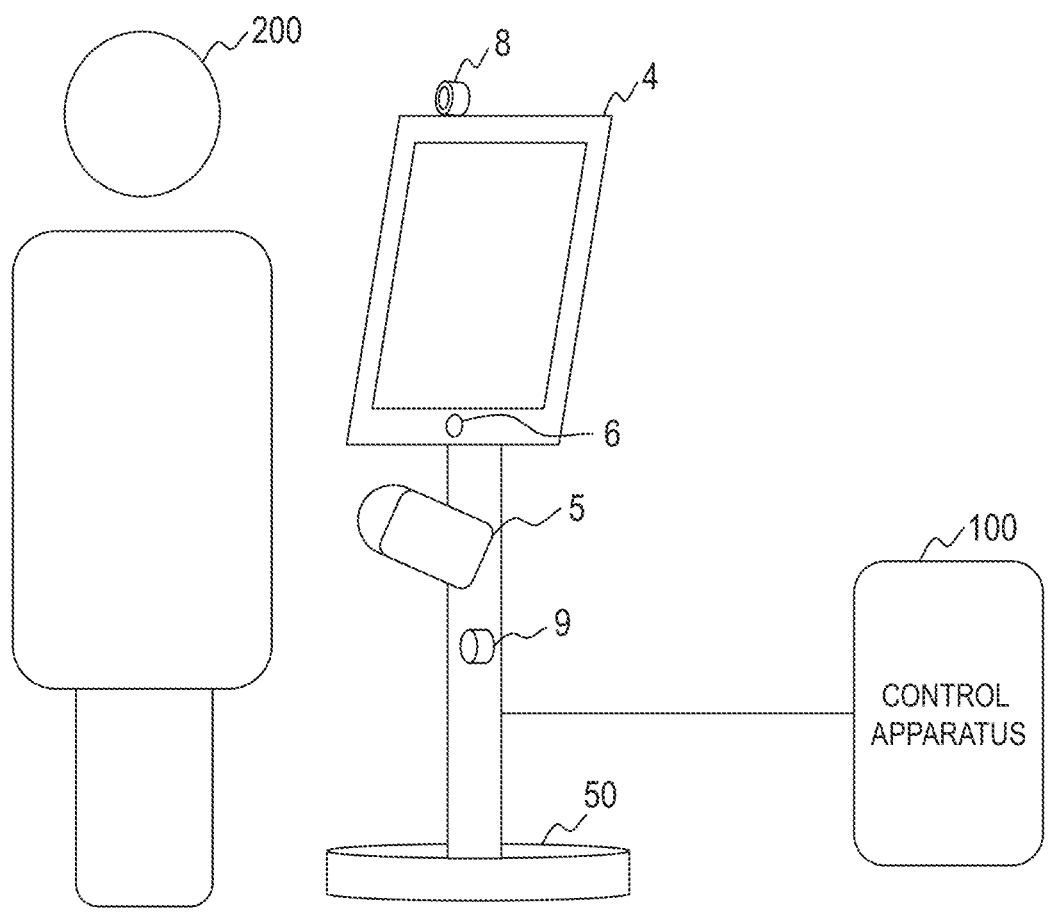
FIG. 1 is a diagram for illustrating an example of a dialogue system according to an embodiment of this invention.

Embodiments of this invention are described below with reference to the accompanying drawings. FIG. 1 is a diagram for illustrating an example of a dialogue system according to an embodiment of this invention. The dialogue system according to the embodiment includes a touch panel 4 positioned to face a user 200, a stand 50 configured to support the touch panel 4, an audio input apparatus 5 installed on the stand 50, an audio output apparatus 6 provided in the touch panel 4, an image input apparatus 8 provided in the touch panel 4, a sensor 9 installed on the stand 50, and a control apparatus 100 configured to control the apparatus that are installed on the stand 50.

In the example described here, the dialogue system according to the embodiment is set up at an airport, a station, a shopping mall, or a similar facility to provide facility information to the user 200 through a prompt for audio input or touch input.

<System Configuration>

Figure 2:
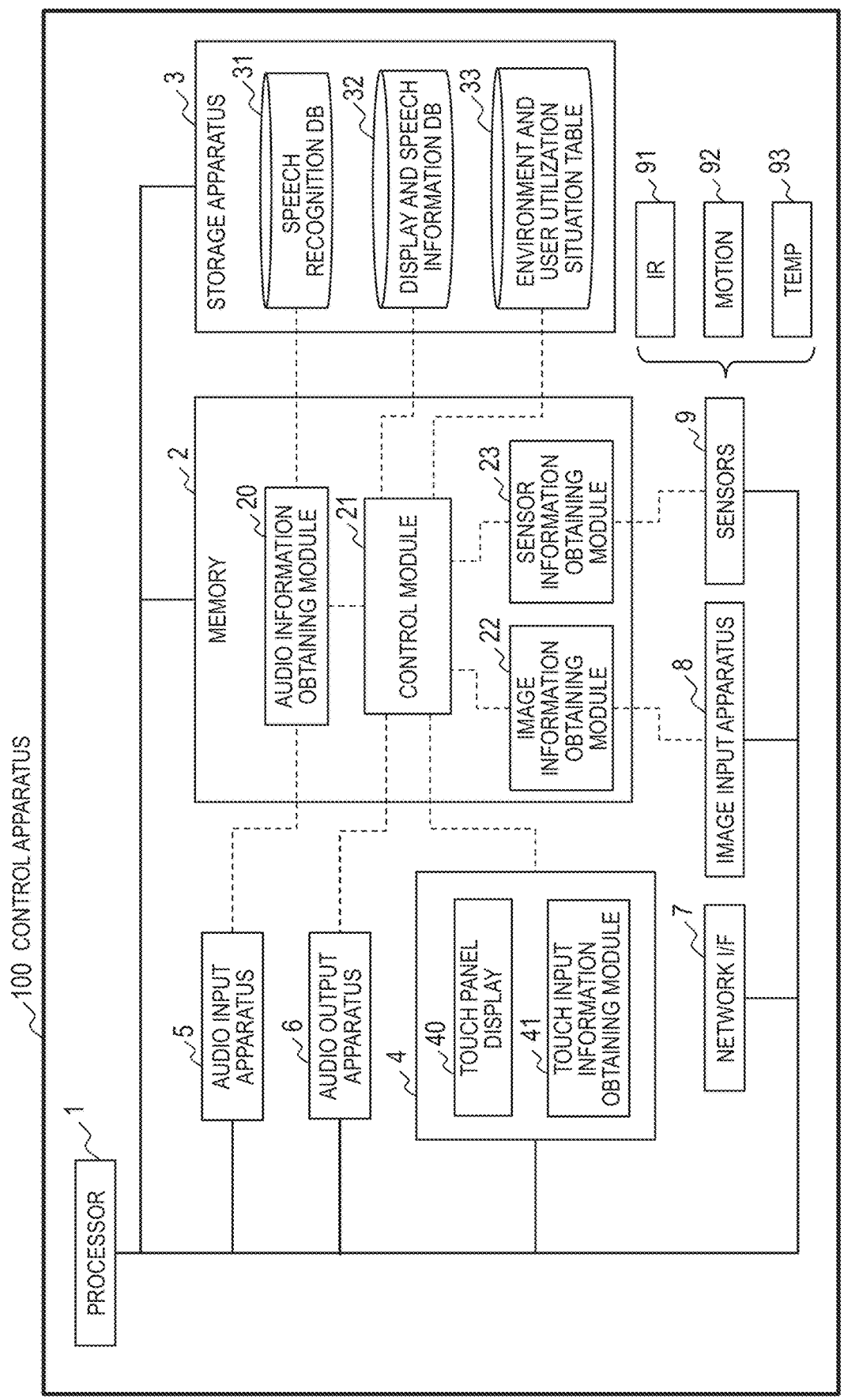
FIG. 2 is a diagram for illustrating an example of the control apparatus according to the embodiment of this invention.

FIG. 2 is a diagram for illustrating an example of the control apparatus 100. The control apparatus 100 is constructed from a computer that includes a processor 1, a memory 2, a storage apparatus 3, the touch panel 4, the audio input apparatus 5, the audio output apparatus 6, a network I/F 7, the image input apparatus 8, and the sensor 9.

The control apparatus 100 is separated from the touch panel 4 in the configuration illustrated in FIG. 1, but the configuration is not limited thereto. For instance, the touch panel 4 and the control apparatus 100 may be integrated, or the sensor 9 and the audio input apparatus 5 may be installed in the touch panel 4. The image input apparatus 8 and the sensor 9 function as sensors configured to detect the situation of the user 200.

An audio information obtaining module 20, a control module 21, an image information obtaining module 22, and a sensor information obtaining module 23 are loaded as programs onto the memory 2 to be executed by the processor 1.

The processor 1 performs processing based on a program of each of the functional modules, to thereby operate as the functional module configured to provide a given function. For example, the processor 1 performs processing based on an audio information obtaining program, to thereby function as the audio information obtaining module 20. The same applies to the other programs. The processor 1 further operates as the functional module configured to provide the function of each of a plurality of pieces of processing executed by each program. A computer and a computer system represent an apparatus and a system, respectively, including those functional modules.

Information including programs and tables for implementing the respective functions of the control apparatus 100 can be stored in: a storage device, for example, the storage apparatus 3, a nonvolatile semiconductor memory, a hard disk drive, or a solid state drive (SSD); or a computer-readable non-transitory data storage medium, for example, an IC card, an SD card, or a DVD.

The storage apparatus 3 stores data to be used by the programs. The stored data in the example illustrated in FIG. 2 are a speech recognition database 31 to be used by the audio information obtaining unit 20, a display and speech information database 32 to be used by the control module 21, and an environment and user utilization situation table 33 to be used by the control module 21. Details of each of the stored data are described later.

The touch panel 4 includes a touch panel display 40 and a touch input information obtaining module 41. The touch panel display 40 displays information output from the control module 21. The touch input information obtaining module 41 transmits the specifics of touch input on the touch panel 4 to the control module 21. The audio input apparatus 5 is constructed from a microphone, and obtains an utterance of the user 200 and ambient noise of the environment in which the dialogue system is set up. The audio output apparatus 6 is constructed from a speaker, and outputs audio from the control module 21.

The network I/F 7 is coupled to a network (not shown). The image input apparatus 8 is constructed from a camera, and takes an image of the user 200. The sensor 9 detects, among others, the presence/absence of the user 200. An infrared (IR) sensor 91, a motion sensor 92, and a temperature sensor 93, for example, may be employed as the sensor 9.

<Outlines of Functions>

The outlines of the function modules are described next. The audio information obtaining module 20 executes speech recognition when an utterance (speech) of the user 200 is input to the audio input apparatus 5, and outputs text corresponding to the speech. The speech recognition may use, for example, Hidden Markov Model or other well-known technologies. Information required for speech recognition, for example, acoustic models, dictionaries, and language models, are stored in the speech recognition database 31 in advance.

The audio information obtaining module 20 also detects ambient noise of an environment in which the touch panel 4 is set up, and outputs the detected noise as, for example, a sound pressure level. The audio information obtaining module 20 transmits text of the result of the speech recognition and the sound pressure level to the control module 21.

The image information obtaining module 22 recognizes an image of the user 200 taken by the image input apparatus 8, and calculates the attributes and situation of the user 200. Image recognition by the image information obtaining module 22 uses, for example, a well-known or publicly known facial recognition technology to discern age and gender as the attributes of the user 200. From the taken image of the user 200, the image information obtaining module 22 detects the number of users 200 and the position of each user 200 as well.

The image information obtaining module 22 may also recognize whether the user 200 is able to operate the touch panel 4. Specifically, the ability/inability to operate the touch panel 4 may be determined by, for example, discerning whether the hands of the user 200 are free. The audio information obtaining module 20 may also determine whether the user 200 is wearing a mask to use the result as information for determining whether to use speech recognition.

The image information obtaining module 22 calculates the discerned ability/inability to operate the touch panel 4, the wearing/non-wearing of a mask, and the like as the situation of the user 200. The image information obtaining module 22 outputs the discerned attributes and situation of the user 200 to the control module 21.

The image information obtaining module 22 may also notify the start of processing to the control module 21 when a new user 200 appears.

The sensor information obtaining module 23 determines the appearance of the user 200 and the end of use (the leaving of the user 200) based on a signal from the infrared sensor 91, the motion sensor 92, or other sensors, and outputs the result as sensor information to the control module 21.

The control module 21 obtains the presence/absence of the user 200 and the attributes and situation of the user 200 from the result of the recognition by the image information obtaining module 22, obtains text corresponding to the speech of the user 200 and ambient noise from the audio information obtaining module 20, and obtains the presence/absence of the user 200 from sensor information of the sensor information obtaining module 23.

The control module 21 then follows a scenario set in advance to make an inquiry to the user 200 and provide facility information guidance to the user 200. As dialogue modes, the control module 21 has Mode 1, in which input on the touch panel 4 (hereinafter referred to as "touch input") is recommended, and Mode 2, in which audio input is recommended. The control module 21 suitably switches between the dialogue modes depending on the situation of the user 200, the running status of the dialogue system, and other factors to execute the operation of providing facility information guidance. The control module 21 is a program including an inquiry module, which generates inquiry information, a guidance module, which generates guidance information, and a mode switching module, which makes a switch between the dialogue modes.

When the user 200 arrives at the touch panel 4, the control module 21 stores an image, speech, and the result of recognition by a sensor in the environment and user utilization situation table 33, reads a scenario 300 and a shop table 400 out of the display and speech information database 32, and starts guiding. After starting guiding, the control module 21 performs control by switching the dialogue mode between Mode 1 and Mode 2 for each dialogue depending on the situation of the user 200 and other factors.

In Mode 1 of the dialogue mode, the control module 21 provides a screen on which the user 200 is prompted to use touch input instead of audio input, or a graphical user interface (GUI) on which an inquiry about the use of touch input is made to the user 200. In Mode 2 of the dialogue mode, on the other hand, the control module 21 provides a screen for motivating the user 200 to use audio input, or a graphical user interface (GUI) on which an inquiry about the use of audio input is made to the user 200.

The screen of the dialogue mode in Mode 1 is configured so that a display area of the touch panel 4 displays options as a touch area in the form of buttons or other forms, thereby prompting the user 200 to use touch input. In Mode 2, on the other hand, no new options are displayed in the display area of the touch panel 4, and a screen on which the user 200 is prompted to use audio input is displayed. For example, the display area in Mode 2 displays an inquiry to the user 200 in text and the inquiry is made in spoken words as well. In Mode 1 and Mode 2, audio input and touch input are treated equally instead of receiving one of the two forms of input preferentially.

Mode 2 may be set so that the touch area in the form of buttons or other forms is not visible in the display area of the touch panel 4. For example, the touch area may be displayed as a transparent area, or as a miniscule area of several dots in size. In Mode 2, a touch input area to be displayed in a header portion of the display area in the form of a "HOME" button, a "HELP" button, and the like is output as in Mode 1.

Inquiry information and other types of information to be presented to the user 200 are set in the scenario 300. Guidance information including shop information and candidate shops is set in the shop table 400. The inquiry information of the scenario 300 may include a plurality of options (e.g., categories).

<Data Details>

Data to be used by the control module 21 is described below. The display and speech information database 32 to be used by the control module 21 includes the scenario 300 and the shop table 400.

Figure 8:
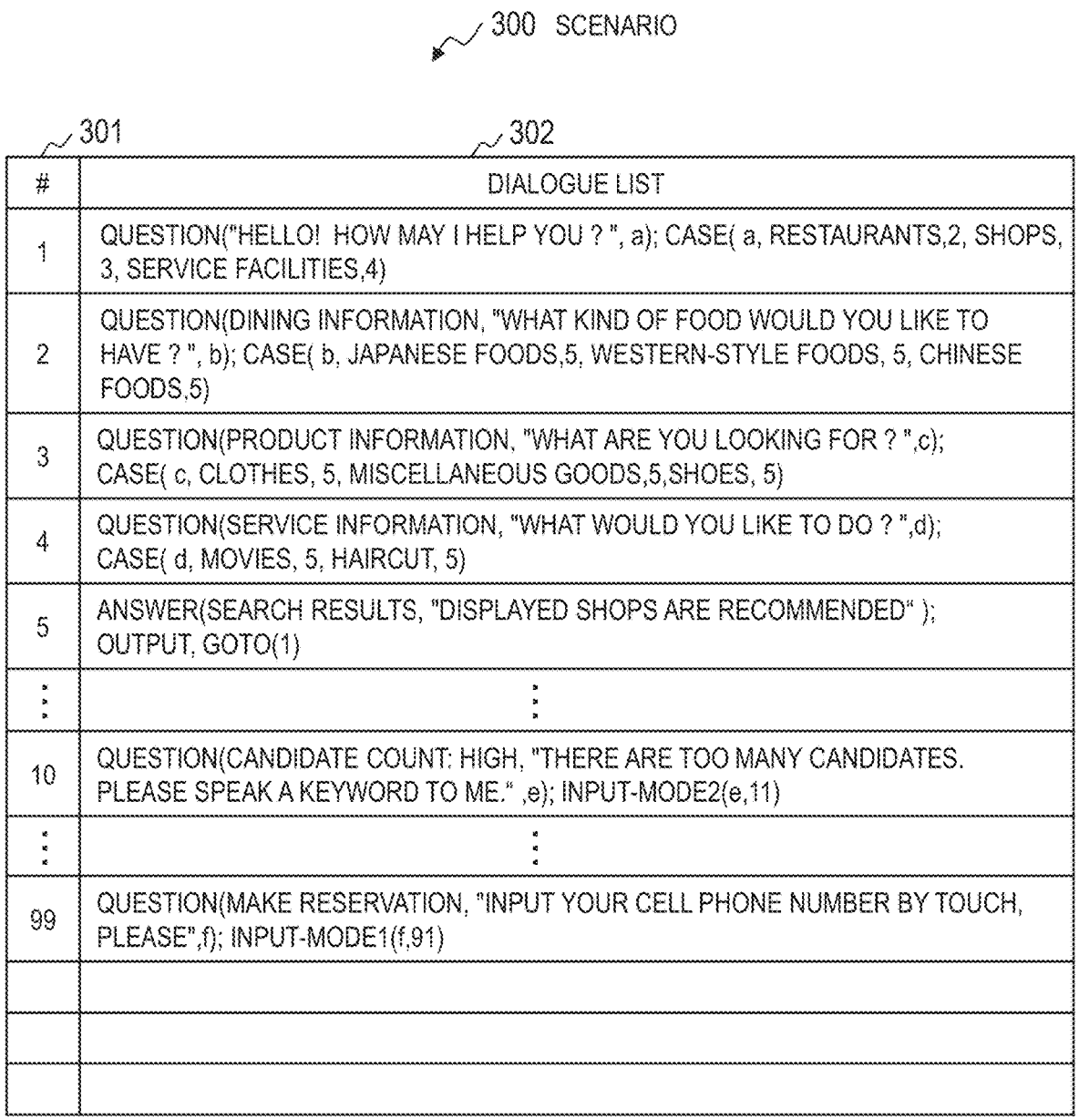
FIG. 8 is a table for showing an example of the scenario to be used by the control module according to the embodiment of this invention.

FIG. 8 is a table for showing an example of the scenario 300 to be used by the control module 21. Each row in the scenario 300 includes a list number ("#" in FIG. 8) 301 and a dialogue list 302.

The dialogue list 302 is a list of dialogue lines to be presented to the user 200 by the dialogue system, and one or more dialogue lines separated by semicolons are written in FIG. 8. Output information, input information, and the list number of the next dialogue are set to the dialogue list 302.

As the output information of the dialogue list 302, "QUESTION" in a list including "1" as the list number 301 means an inquiry to the user 200, and the control module 21 outputs a dialogue line "Hello! How may I help you?" in a display format or a speech format, depending on the current dialogue mode. Options "restaurants", "shops", and "service facilities" of inquiry information that are to be displayed in Mode 1 and the list number 301 of the next dialogue are set to "CASE".

For example, when the user 200 selects "restaurants", the next processing uses a dialogue list including "2" as the list number 301, and a value indicating "restaurants" and obtained through touch input is stored as a variable "a".

"QUESTION" in the dialogue list including "2" as the list number 301 is an inquiry about which one of meal-related sub-categories "Japanese foods", "Western-style foods", and "Chinese foods" is to be selected. With an answer to the inquiry (a selection result) as input, the control module 21 searches the shop table 400. The next processing uses a dialogue list including "5" as the list number 301, and the control module 21 accordingly outputs, as "ANSWER", candidates for guidance information that are search results associated with the answer.

In the example shown in FIG. 8, "GOTO(1)" is used to return to the list including "1" as the list number 301 after the search results are output ("OUTPUT") in the list including "5" as the list number 301. However, this invention is not limited thereto. For instance, the dialogue system may ask the user 200 to select a desired shop from the output candidates to provide more detailed information or check for available tables or seats.

The dialogue list 302 may limit the control module 21 to one of the dialogue modes. "QUESTION" in a dialogue list including "99" as the list number 301 is an example in which the input of the cell phone number of the user 200 for a reservation for a service provided by a shop is limited to Mode 1. The dialogue system may recommend touch input for the input of personal information and privacy-related information.

"QUESTION" in a dialogue list including "10" as the list number 301 is an example in which the dialogue mode is limited to Mode 2, namely, an audio input mode, because there are so many candidates for guidance information found as search results that touch input is inconvenient.

The control module 21 follows one list number 301 after another list number 301 of the scenario 300 described above to present dialogue lines in the currently set dialogue mode.

FIG. 9 is a table for showing an example of the shop table 400 to be used by the control module 21. The shop table 400 includes a category 401 for storing the type of a shop, a sub-category 402 for storing a more finely classified type, and shop information 403 for storing information of each individual shop.

FIG. 5 is a table for showing an example of the environment and user utilization situation table 33 to be used by the control module 21. The environment and user utilization situation table 33 is generated for each new user 200.

The environment and user utilization situation table 33 includes a participating user count 331, noise 332, a last dialogue mode 333, a dialogue count 334, a speech recognition precision 335, an interval-time-to-input 336, a user situation 337, and a user position 338.

How many users 200 are present in front of the touch panel 4 is stored as the participating user count 331. A value corresponding to the sound pressure level of noise that is calculated by the audio information obtaining module 20 is set as the noise 332. In the example shown in FIG. 5, the sound pressure level is classified into three stages, namely, high, intermediate, and low.

The current dialogue mode is stored as the dialogue mode 333. The number of dialogues presented to the current user 200 is stored as the dialogue count 334. The precision of speech recognition (speech recognition rate) calculated by the audio information obtaining module 20 is stored as the speech recognition precision 335. The number of times an utterance of the current user 200 has been recognized may be stored as the speech recognition precision 335.

A time interval (for example, an average value) until the user 200 executes audio input or touch input is stored as the interval-time-to-input 336. Matters to be taken into consideration about the user 200 are stored as the user situation 337. Given matters predicted to affect speech recognition and touch input, for example, the wearing of a mask and the carrying of bags in both hands, are stored as matters to be taken into consideration.

A position at which the user 200 is situated in relation to the position of the touch panel 4 is stored as the user position 338. The position of the user 200 is detected by the image information obtaining module 22.

<Details of Processing>

Figure 3:
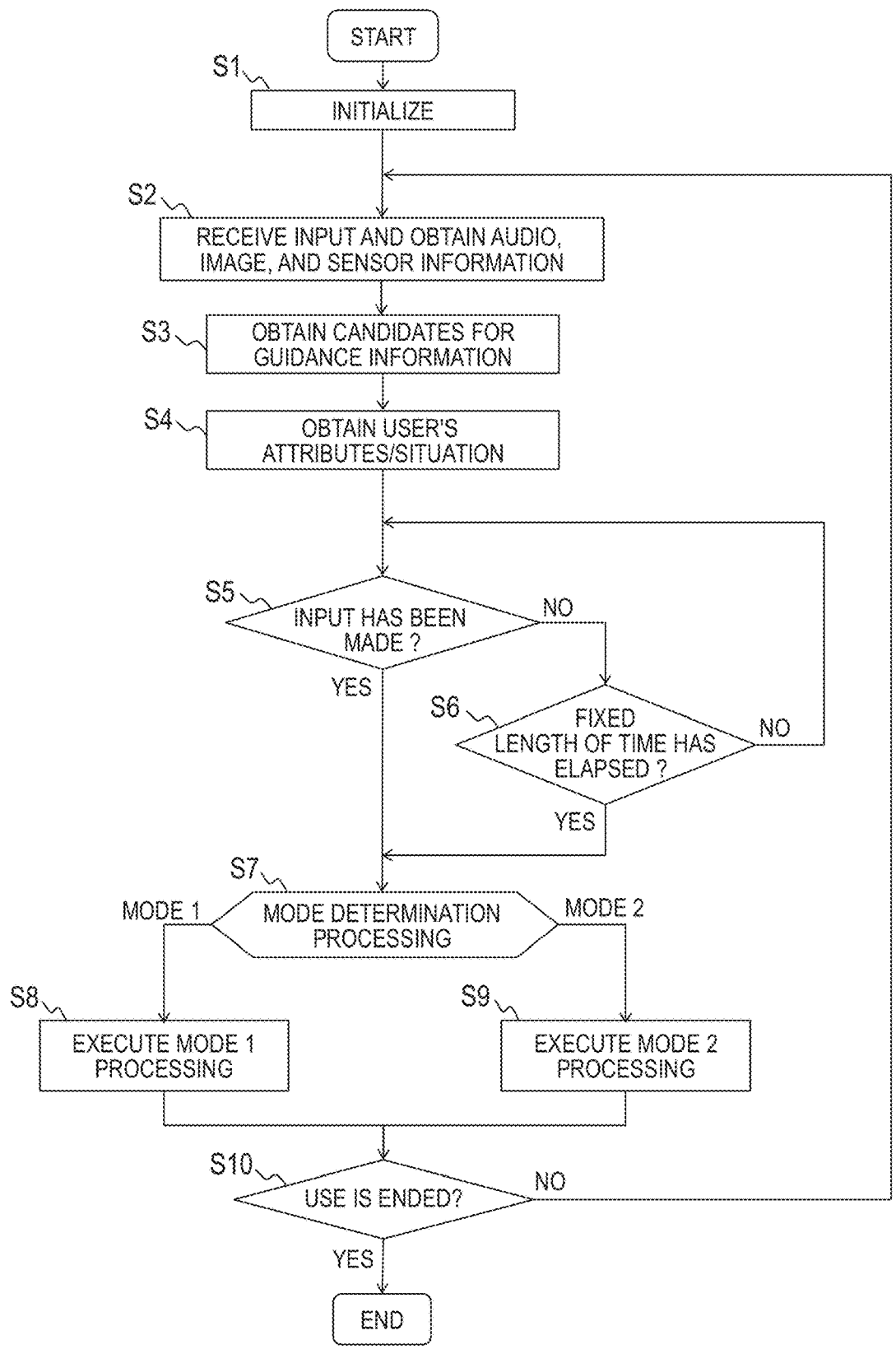
FIG. 3 is a flow chart for illustrating an example of dialogue processing to be executed in the control apparatus according to the embodiment of this invention.

FIG. 3 is a flow chart for illustrating an example of dialogue processing to be executed in the control apparatus 100. This processing is executed when the control module 21 recognizes that a new user 200 has appeared based on information from the sensor information obtaining module 23 and the image information obtaining module 22.

In Step S1, the control module 21 initializes the environment and user utilization situation table 33, and then sets "1" as the first list number 301 of the scenario 300 whose execution is to be started.

In Step S2, the control module 21 receives input in a format dictated by the set dialogue mode. In the embodiment, the default dialogue mode is set to Mode 2 to receive input from the audio input apparatus 5. The control apparatus 100 is also capable of receiving touch input in Mode 2 and is also capable of receiving audio input in Mode 1.

The control module 21 receives a speech recognition result from the audio information obtaining module 20, touch input from the touch input information obtaining module 41, an image recognition result from the image information obtaining module 22, and sensor information from the sensor information obtaining module 23.

In Step S3, the control module 21 obtains the number of candidates for guidance information to be output in the next dialogue by the execution of the last dialogue. In Step S4, the control module 21 obtains the attributes and situation of the user 200 based on the obtained image recognition result. The control module 21 writes the above-mentioned speech recognition result, image recognition result, and sensor information of the current user 200 in the environment and user utilization situation table 33 to update the table.

In Step S5, the control module 21 determines whether input in a format dictated by the dialogue mode has been made, and proceeds to Step S7 when input has been received. When there is no input, the control module 21 returns to Step S5 after the elapse of a fixed length of time is confirmed in Step S6, and repeats the processing of Step S5.

In Step S7, the control module 21 obtains audio, touch input, an image, and sensor information to determine a mode in which a dialogue with the current user 200 is to be held. Specifically, the control module 21 determines which one of Mode 1 and Mode 2 is a dialogue mode suitable for the attributes and situation of the user 200. The processing of Step S7 is described later with reference to FIG. 4.

When Mode 1 recommending touch input is chosen by the control module 21 in Step S7, the control module 21 proceeds to Step S8. When Mode 2 recommending audio input is chosen by the control module 21 in Step S7, the control module 21 proceeds to Step S9 to execute one dialogue from a list in the scenario 300 that has the specified list number 301.

While an example of executing one dialog in the scenario 300 at a time is described in the embodiment, this invention is not limited thereto. For instance, when the user 200 answers to the inquiry "Hello! How may I help you?" with "I want to have curry and rice" from the start, the control module 21 may directly proceed to present shops where curry and rice is served as candidates. This is equivalent to executing three dialogues in the scenario for selecting the "restaurants" category, then the "Western-style foods" category, and then the "curry and rice" category.

When the execution of one dialogue from a list specified by the list number 301 is finished in one of Step S8 for Mode 1 and Step S9 for Mode 2, the control module 21 proceeds to Step S10 to determine whether to end the dialogue processing.

When a given ending condition is not satisfied, the control module 21 returns to Step S2 to receive input, and proceeds to a list in the scenario 300 that has the next list number 301. When the given ending condition is satisfied, on the other hand, the control module 21 ends the dialogue processing.

The given ending condition is, for example, the detection of the leaving of the user 200 by the image information obtaining module 22, the detection of the leaving of the user 200 by the sensor information obtaining module 23 with the use of the infrared sensor 91 or the motion sensor 92, a touch to an end button on the touch panel 4, or the detection of an utterance "bye-bye" or "goodbye" from the user 200 by the audio information obtaining module 20.

The dialogue processing described above enables the control module 21 to smoothly navigate a dialogue by executing the mode determination processing each time one dialogue (a list specified by the list number 301) in the scenario 300 is executed and choosing a dialogue mode suitable for the attributes and situation of the user 200. In addition, the dialogue mode may be limited to Mode 1 in the scenario 300 to prohibit audio input for the input of personal information and similar information, and a switch to a dialogue mode suitable for the specifics of a dialogue can accordingly be made.

Triggers to start the dialogue processing include, in addition to the arrival of the user 200, a touch to a start button on the touch panel 4 by the user 200, and input of an utterance "start" or the like to the audio input apparatus 5.

Figure 4:
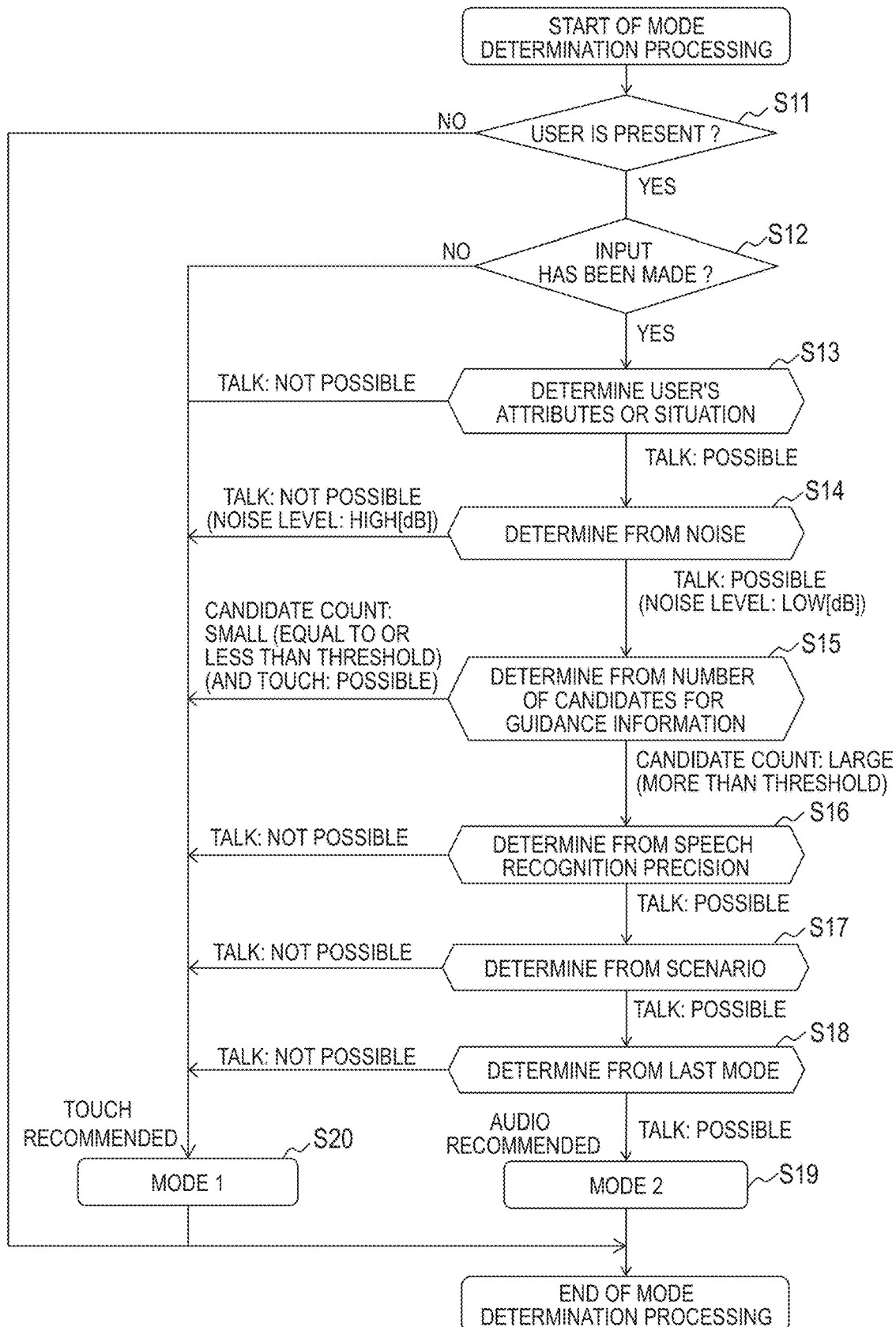
FIG. 4 is a flow chart for illustrating an example of the mode determination processing according to the embodiment of this invention.

FIG. 4 is a flow chart for illustrating an example of the mode determination processing, which is executed in Step S7 of FIG. 3 described above.

In Step S11, the control module 21 determines whether the user 200 is in front of the touch panel 4 based on the sensor information and the image recognition result. The control module 21 ends the mode determination processing when the user 200 leaves, and proceeds to Step S12 when the user 200 is present.

In Step S12, the control module 21 determines whether one of audio input and touch input has been made in Step S2 of FIG. 3. The control module 21 proceeds to Step S13 when determining that there has been one of audio input and touch input, and proceeds to Step S20 when determining that no input has been made.

In Step S13, the control module 21 determines whether audio input is possible based on the attributes and situation of the user 200 obtained in Step S2 to Step S4 of FIG. 3. When the obtained situation of the user 200 indicates bags in both hands, for example, the control module 21 determines that Mode 2 recommending audio input is suitable, and proceeds to Step S14. When the user 200 is wearing a mask, on the other hand, the control module 21 determines that Mode 1 ("Talk: not possible" in FIG. 4) recommending touch input is suitable because there is a fear of a drop in speech recognition precision, and proceeds to Step S20.

In Step S14, the control module 21 determines whether the sound pressure level of the noise obtained from the audio information obtaining module 20 exceeds a given threshold Th1. When the sound pressure level exceeds the given threshold Th1, the speech recognition precision is lowered by the ambient noise, and the control module 21 accordingly chooses Mode 1 and proceeds to Step S20. When the sound pressure level is equal to or lower than the given threshold Th1, on the other hand, the noise affects the speech recognition precision little, and the control module 21 accordingly chooses Mode 2 and proceeds to Step S15.

In Step S15, the control module 21 determines whether the number of candidates for guidance information obtained in Step S4 of FIG. 3 exceeds a given threshold Th2. When the given threshold Th2 is exceeded, the number of pages to be displayed on the touch panel 4 and the number of times touch input is made are large, and the control module 21 accordingly chooses Mode 2 recommending audio input and proceeds to Step S16. When the number of candidates for guidance information is equal to or less than the given threshold Th2, on the other hand, the control module 21 chooses Mode 1 recommending touch input and proceeds to Step S20.

In Step S16, the control module 21 obtains the speech recognition precision from the audio information obtaining module 20, and when the obtained speech recognition precision is equal to or lower than a given threshold Th3, the control module 21 determines that the dialogue by audio input is not being conducted smoothly. Then the control module 21 chooses Mode 1 recommending touch input, and proceeds to Step S20. Otherwise, the control module 21 proceeds to Step S17.

The speech recognition precision is calculated from the ratio of the number of correct words to the number of recognized words by, for example, comparing a word recognized through speech recognition (a recognized word) by the audio information obtaining module 20 and a word in a word dictionary, which is stored in the speech recognition database 31 in advance, and determining the recognized word as a correct word when the recognized word matches a word in the word dictionary. The calculation of the speech recognition precision is not limited to this method, and may use the Bilingual Evaluation Understudy (BLEU: automated evaluation) or a similar score.

In Step S17, the control module 21 obtains the dialogue list 302 that includes a dialogue to be executed next, determines whether there is a restriction on the dialogue mode, and, when there is a restriction, chooses the specified mode out of Mode 1 and Mode 2. The control module 21 proceeds to Step S20 when Mode 1 is chosen, and proceeds to Step S18 when Mode 2 is chosen.

In Step S18, the control module 21 maintains the dialogue mode executed last time. When Mode 1 is the dialogue mode used to execute a dialogue from the dialogue list 302 last time, the control module 21 proceeds to Step S20 to choose Mode 1. When Mode 2 is the dialogue mode used to execute a dialogue from the dialogue list 302 last time, the control module 21 proceeds to Step S19 to choose Mode 2.

Through the mode determination processing described above, the dialogue mode can be switched between Mode 1 recommending touch input and Mode 2 recommending audio input for each dialogue from the dialogue list 302, depending on the attributes and situation of the user 200 or the environment in which the touch panel 4 is set up. This enables the control module 21 to decrease the inconvenience of touch input by a switch from touch input to audio input when the number of candidates for guidance information exceeds the given threshold Th2.

The description given above deals with an example of determining which dialogue mode to use by determining whether the use of Mode 2 recommending audio input is possible ("Talk: possible" and "Talk: not possible" in FIG. 4), but this invention is not limited thereto. For instance, one of Mode 1 and Mode 2 may be chosen based on the positive sign/negative sign of the sum of points that are calculated in Step S15 to Step S20 by giving +1 point when Mode 1 is chosen and −1 point when Mode 2 is chosen.

The determination in Step S13 to the determination in Step S18 are not limited to the order illustrated in FIG. 4. Not all of the determination in Step S13 to the determination in Step S18 may be used, and other determination standards may be set.

<Display Screen>

Figure 6A:
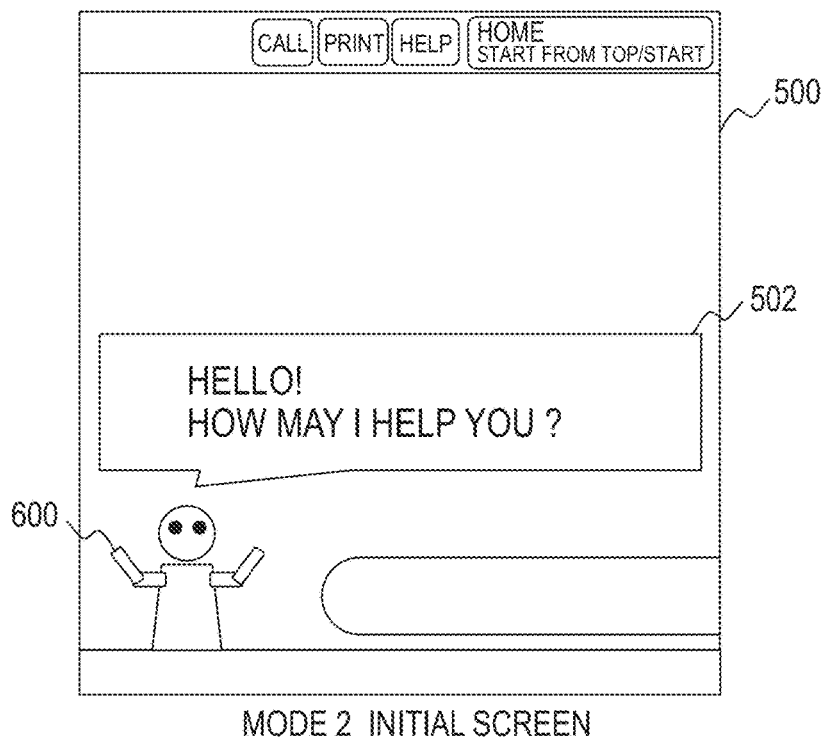
FIG. 6A is a diagram for illustrating an example of an initial screen 500 of the touch panel according to the embodiment of this invention.

An example of screens displayed on the touch panel 4 by the processing described above is described below. FIG. 6A is a diagram for illustrating an example of an initial screen 500 of the touch panel 4. The initial screen 500 displays an avatar (or a character) 600 as a guidance of the facility in a lower left part of the screen. A message from the avatar 600 is displayed in a dialogue balloon 502.

The position of the avatar 600 is not limited to the lower left part of the screen as illustrated in FIG. 6A, and may be displayed at the center or any given position. The display screen may also omit displaying the avatar 600.

Figure 6B:
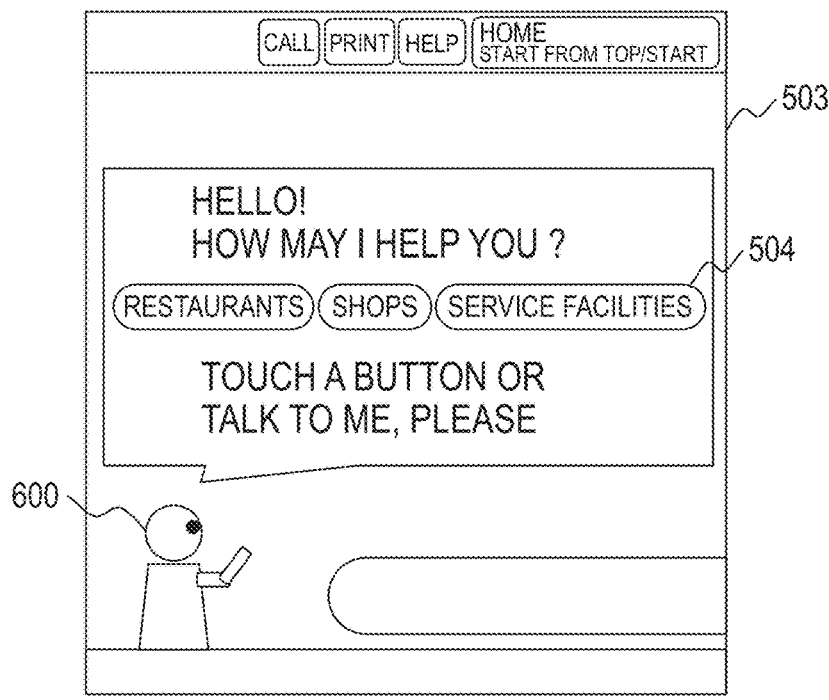
FIG. 6B is a diagram for illustrating an example of a category selection screen according to the embodiment of this invention.

FIG. 6B is a diagram for illustrating an example of a category selection screen 503 displayed after a dialogue from a list in the scenario 300 that has "1" as the list number 301 is executed. In the example of FIG. 6B, there has been no audio input from the user 200 (the elapse of the fixed length of time: Step S6) in response to the spoken inquiry made by the control module 21 in FIG. 6A, or speech recognition has failed, and the dialogue mode has consequently been switched to Mode 1. When input from the user 200 is received properly in FIG. 6A, a screen of FIG. 6C described later is displayed, or facility information or shop information may be displayed directly.

When the user 200 selects a category and gives the answer by touch input under the state of FIG. 6B, the control module 21 searches the shop table 400 to obtain the shop information 403 from the selected category 401. The control module 21 then determines in Step S15 of FIG. 4 whether the number of candidates for guidance information exceeds the given threshold Th2. When the number of candidates for guidance information is equal to or less than the threshold th2, the number of candidates is small enough to display the candidates in one screen. The control module 21 accordingly switches the dialogue mode to Mode 1 and outputs a selection result display screen 505 of FIG. 6C.

Figure 6C:
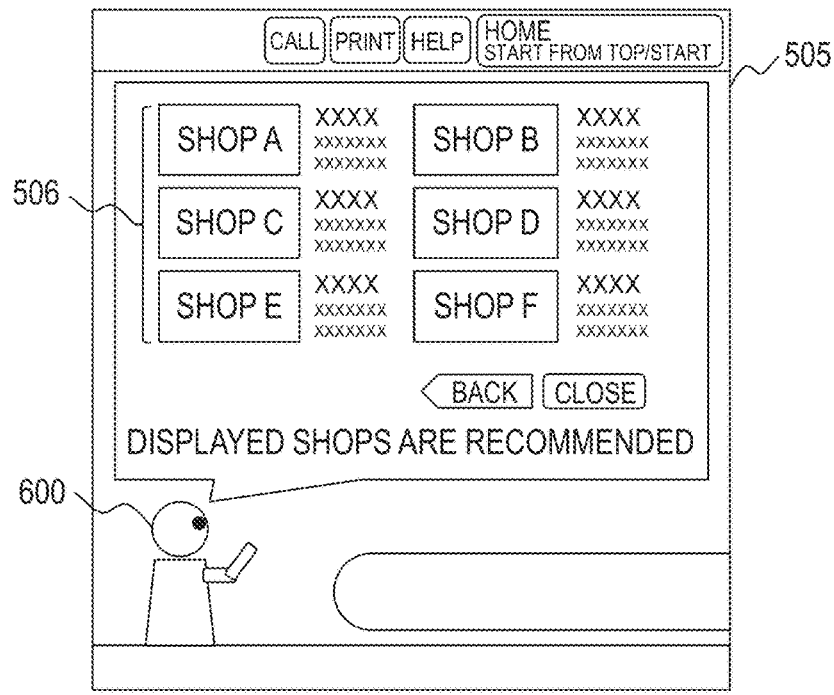
FIG. 6C is a diagram for illustrating an example of a selection result display screen according to the embodiment of this invention.

Candidates 506 selected as candidates are displayed on the selection result display screen 505 of FIG. 6C. Further detailed information is provided at a touch to one of the candidates 506.

When the number of candidates for guidance information exceeds the given threshold Th2, on the other hand, repetitive touch input makes the operation inconvenient as described in Step S17. The control module 21 deals with this by setting the dialogue mode to Mode 2, in which audio input is recommended, and outputting a selection result display screen 507 illustrated in FIG. 6D. The control module 21 starts narrowing down the candidates based on the user's audio input, and continues the dialogue.

Figure 6D:
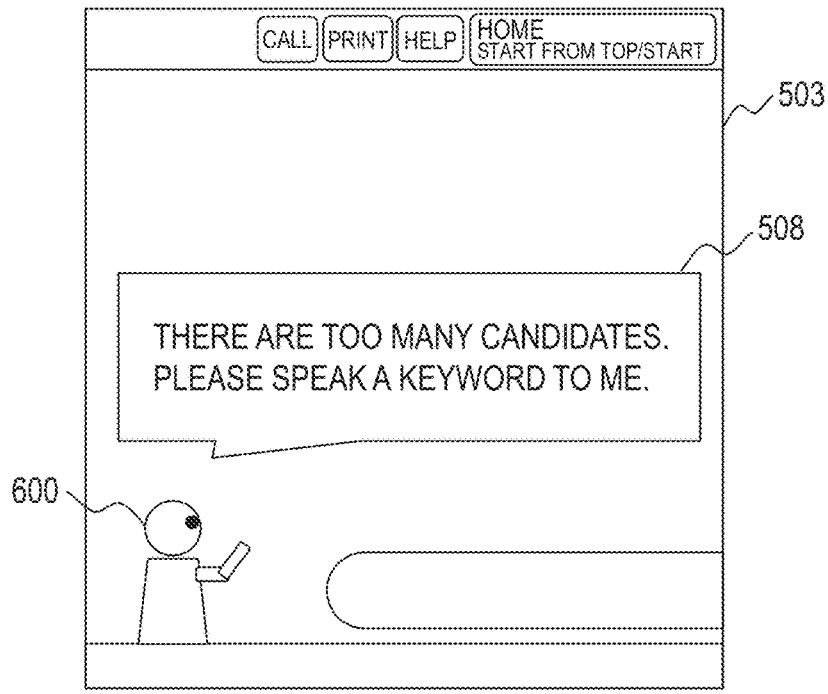
FIG. 6D is a diagram for illustrating an example of a selection result display screen according to the embodiment of this invention.

In FIG. 6D, the control module 21 outputs an inquiry "There are too many candidates. Please speak a keyword to me." in a speech format and a screen display format, without displaying new options on the touch panel 4, thereby recommending audio input to the user 200.

The selection result display screen 507 illustrated in FIG. 6D displays the result of speech recognition performed on audio input in a dialogue balloon 508 to present the result of speech recognition to the user 200. This makes the user 200 feel secure about the extraction of candidates for guidance information by audio input.

As described above, according to the embodiment of this invention, a dialogue system easy for the user 200 to operate by complementing audio input and touch input with each other can be provided by a switch that is made between Mode 2, in which audio input is recommended, and Mode 1, in which touch input is recommended, depending on the attributes and situation of the user 200.

Modification Example

Figure 7A:
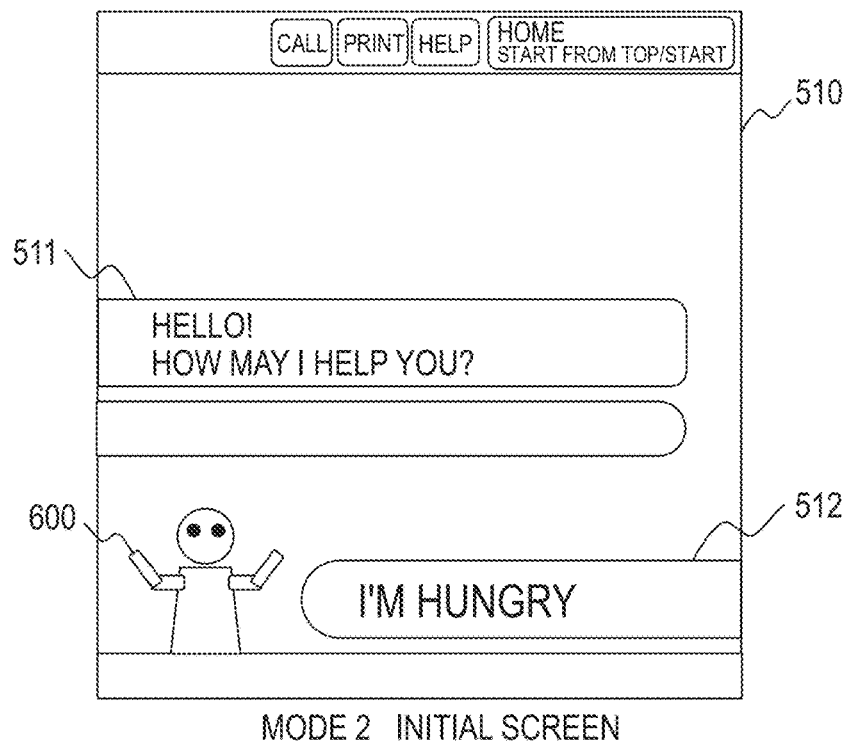
FIG. 7A is a diagram for illustrating an example in which an initial screen is displayed on the touch panel according to the embodiment of this invention.
Figure 7B:
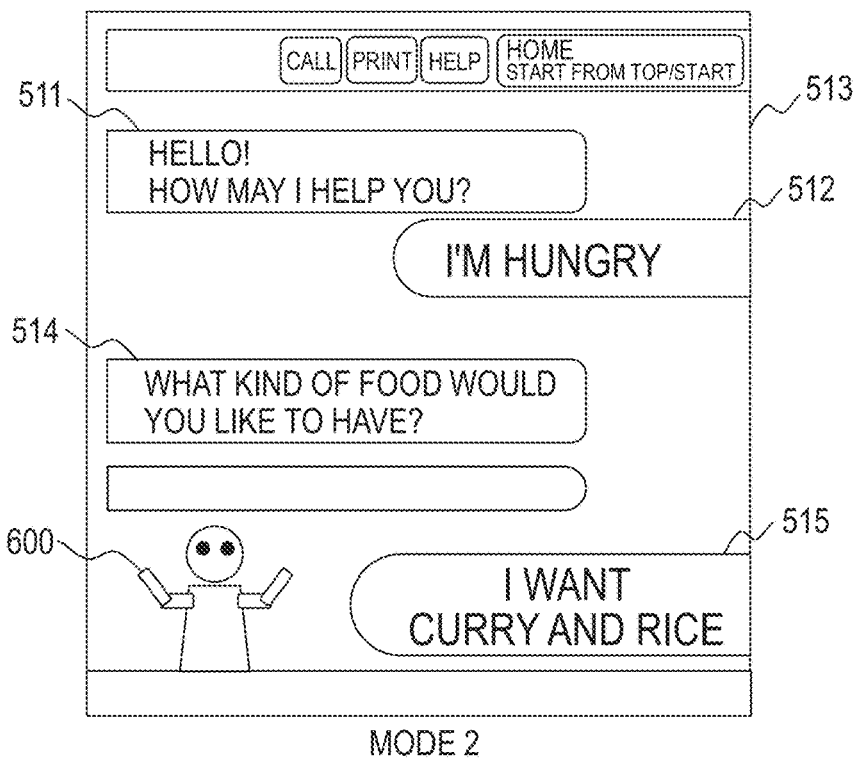
FIG. 7B is a diagram for illustrating an example in which an inquiry screen is displayed on the touch panel according to the embodiment of this invention.
Figure 7C:
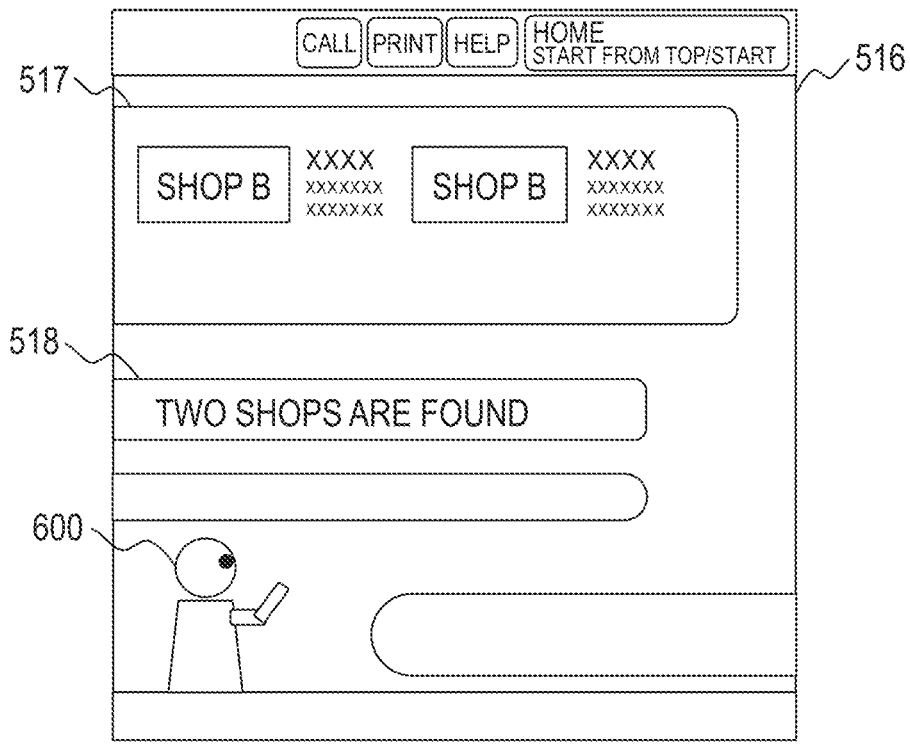
FIG. 7C is a diagram for illustrating an example in which results of the search on inquiry screen is displayed on the touch panel according to the embodiment of this invention.

FIG. 7A to FIG. 7C are diagrams for illustrating a modification example of the embodiment, in which facility information guidance is provided through a random dialogue using a natural language, in place of a dialogue that follows the scenario 300 in the embodiment.

FIG. 7A is a diagram for illustrating an example in which an initial screen 510 is displayed on the touch panel 4 in Mode 2 recommending audio input. When the user 200 says "I'm hungry" to the dialogue system while the initial screen 510 is displayed, the control module 21 outputs the result of speech recognition processing executed by the audio information obtaining module 20 to a dialogue balloon 512.

The control module 21 generates a sentence "What kind of food would you like to have?" in response to "I'm hungry", and outputs the sentence in a speech format from the audio output apparatus 6. The control module 21 further displays an inquiry screen 513 illustrated in FIG. 7B on the touch panel 4.

When the user 200 inputs "I want to have curry and rice" by audio input while the inquiry screen 513 is displayed, the control module 21 outputs the result of speech recognition by the audio information obtaining module 20 to a dialogue balloon 515, and searches for the shop information 403 that includes "curry and rice". The control module 21 displays candidates for guidance information that are the results of the search on an inquiry result display screen 516 illustrated in FIG. 7C.

In the example illustrated in FIG. 7C, the number of candidates for guidance information is equal to or less than the threshold Th2, and the dialogue mode is switched to Mode 1 to display guidance information 517 about shops at which curry and rice is served, and a candidate count 517.

In Mode 2, comments (511, 514, and 518) to be presented to the user 200 and the results of speech recognition (512 and 515) performed on the utterances of the user 200 are displayed on the touch panel 4, and the utterances of the control apparatus 100 and the user 200 can accordingly be confirmed in text.

CONCLUSION

The embodiment described above deals with an example in which the control apparatus 100 includes the audio information obtaining module 20, the image information obtaining module 22, and the sensor information obtaining module 23. However, the speech recognition, image recognition, and sensor information determination processing of the modules may be executed on another computer coupled via a network (not shown).

While an example of permitting audio input in Mode 1, in which touch input is recommended, is described in the embodiment, audio input may be prohibited in Mode 1 so that a dialogue is held through touch input to the touch panel 4.

This invention is not limited to the embodiments described above, and encompasses various modification examples. For instance, the embodiments are described in detail for easier understanding of this invention, and this invention is not limited to modes that have all of the described components. Some components of one embodiment can be replaced with components of another embodiment, and components of one embodiment may be added to components of another embodiment. In each embodiment, other components may be added to, deleted from, or replace some components of the embodiment, and the addition, deletion, and the replacement may be applied alone or in combination.

Some of all of the components, functions, processing units, and processing means described above may be implemented by hardware by, for example, designing the components, the functions, and the like as an integrated circuit. The components, functions, and the like described above may also be implemented by software by a processor interpreting and executing programs that implement their respective functions. Programs, tables, files, and other types of information for implementing the functions can be put in a memory, in a storage apparatus such as a hard disk, or a solid state drive (SSD), or on a recording medium such as an IC card, an SD card, or a DVD.

The control lines and information lines described are lines that are deemed necessary for the description of this invention, and not all of control lines and information lines of a product are mentioned. In actuality, it can be considered that almost all components are coupled to one another.

What is claimed is:

1. A method of controlling a communication system including a processor, a memory, an audio input apparatus configured to process speech input as audio input, an audio output apparatus, and a touch panel including a display unit configured to process touch input, the method comprising:

an inquiry step of generating, by the processor, inquiry information including at least one option, and outputting the inquiry information from one of the audio output apparatus and the touch panel;

an input step of receiving, by the processor, an answer to the inquiry information through one of the audio input apparatus and the touch panel;

a guidance step of generating, by the processor, candidates for guidance information that correspond to the answer, and outputting the candidates for the guidance information from one of the audio output apparatus and the touch panel; and a mode selection step of choosing, by the processor, a mode suitable for a running status of the communication system from a touch communication mode, in which a user is prompted to use the touch input, and an audio communication mode, in which the user is prompted to use the audio input, each of the inquiry step and the guidance step comprising using one of the touch communication mode and the audio communication mode that is chosen in the mode selection step, wherein the running status of the communication system comprises a value of noise detected by the audio input apparatus, wherein the mode selection step comprises a first step of choosing, by the processor, the audio communication mode when the value of noise is equal to or less than a first threshold, and choosing, by the processor, the touch communication mode when the value of noise exceeds the first threshold, wherein the running status of the communication system further comprises a number of candidates for the guidance information, and wherein when the value of noise is equal to or less than the first threshold and the audio communication mode is chosen, the mode selection step further comprises a second step of switching, by the processor, to the touch communication mode when the number of candidates for the guidance information is equal to or less than a second threshold, and wherein when the value of noise is equal to or less than the first threshold and the audio communication mode is chosen, the mode selection step further comprises a third step of continuing to choose, by the processor, the audio communication mode when the number of candidates for the guidance information exceeds the second threshold.

2. The method of controlling a communication system according to claim 1, wherein the running status of the communication system comprises a speech recognition precision based on a result of speech recognition that is performed on a speech received by the audio input apparatus, and wherein when, in the first step and the second step of the mode selection step, the audio communication mode is chosen, the mode selection step further comprises a third step of choosing the touch communication mode when the speech recognition precision is equal to or lower than a second threshold, and choosing the audio communication mode when the speech recognition precision exceeds the given second threshold.

3. The method of controlling a communication system according to claim 1, wherein the running status of the communication system comprises sensor information detected by a sensor and an imaging apparatus, which obtains an image of the user, which indicates a situation of the user who uses the communication system, and wherein when, in the first step and the second step of the mode selection step, the audio communication mode is chosen, the mode switching step further comprises a third step of choosing one of the touch communication mode and the audio communication mode based on the sensor information.

4. The method of controlling a communication system according to claim 1, wherein the running status of the communication system comprises an execution status of a scenario including a sequence of questions for generating the inquiry information, and wherein when, in the first step and the second step of the mode selection step, the audio communication mode is chosen, the mode selection step further comprises choosing one of the touch communication mode and the audio communication mode based on a communication mode set in the scenario.

5. The method of controlling a communication system according to claim 1, further comprising displaying on the touch panel a result of speech recognition that is performed on a speech received by the audio input apparatus.

6. A communication system, which includes a processor, a memory, an audio input apparatus configured to process speech input as audio input, an audio output apparatus, and a touch panel including a display unit configured to process touch input, the communication system comprising:

an inquiry module configured to generate inquiry information including at least one option, and output the inquiry information from one of the audio output apparatus and the touch panel;

an input module configured to receive an answer to the inquiry information through one of the audio input apparatus and the touch panel;

a guidance module configured to generate candidates for guidance information that correspond to the answer, and output the candidates for the guidance information from one of the audio output apparatus and the touch panel; and a mode selection module configured to choose, by the processor, a mode suitable for a running status of the communication system from a touch communication mode, in which a user is prompted to use the touch input based on the inquiry information are output to the touch panel, and an audio communication mode, in which the user is prompted to use the audio input, each of the inquiry module and the guidance module being configured to use one of the touch communication mode and the audio communication mode that is chosen in the mode selection module, wherein the running status of the communication system comprises a value of noise detected by the audio input apparatus, wherein the mode selection step comprises a first step of choosing, by the processor, the audio communication mode when the value of noise is equal to or less than a first threshold, and choosing, by the processor, the touch communication mode when the value of noise exceeds the first threshold, wherein the running status of the communication system comprises a speech recognition precision based on a result of speech recognition that is performed on a speech received by the audio input apparatus, and wherein when the value of noise is equal to or less than the first threshold and the audio communication mode is chosen, the mode selection step further comprises a second step of switching, by the processor, to the touch communication mode when the speech recognition precision is equal to or lower than a second threshold, and wherein when the value of noise is equal to or less than the first threshold and the audio communication mode is chosen, the mode selection step further comprises a third step of continuing to choose, by the processor, the audio communication mode when the speech recognition precision exceeds the given second threshold.

7. A computer-readable non-transitory data storage medium, containing a program for controlling a computer, the computer including a processor, a memory, an audio input apparatus configured to process speech input as audio input, an audio output apparatus, and a touch panel including a display unit configured to process touch input, the program causing the computer to execute:

an inquiry step of generating inquiry information including at least one option, and outputting the inquiry information from one of the audio output apparatus and the touch panel;

an input step of receiving an answer to the inquiry information through one of the audio input apparatus and the touch panel;

a guidance step of generating candidates for guidance information that correspond to the answer, and outputting the candidates for the guidance information from one of the audio output apparatus and the touch panel; and a mode selection step of choosing, by the processor, a mode suitable for a running status of the computer from a touch communication mode, in which a user is prompted to use the touch input based on the inquiry information are output to the touch panel, and an audio communication mode, in which the user is prompted to use the audio input each of the inquiry step and the guidance step comprising using one of the touch communication mode and the audio communication mode that is chosen in the mode selection step, wherein the running status of the communication system comprises a value of noise detected by the audio input apparatus, wherein the mode selection step comprises choosing, by the processor, the audio communication mode when the value of noise is equal to or less than a first threshold, and choosing, by the processor, the touch communication mode when the value of noise exceeds the first threshold, wherein the running status of the communication system comprises sensor information detected by a sensor and an imaging apparatus, which obtains an image of the user, which indicates a situation of the user who uses the communication system, and wherein when the value of noise is equal to or less than the first threshold and the audio communication mode is chosen, the mode selection step further comprises a second step of switching, by the processor, to the touch communication mode when the image of the user indicates that the user cannot use the audio communication mode, and wherein when the value of noise is equal to or less than the first threshold and the audio communication mode is chosen, the mode selection step further comprises a third step of continuing to choose, by the processor, the audio communication mode when the image of the user indicates that the user can use the audio communication mode.

* * * * *